United States Patent [19]

Christensen

[11] 4,280,267

[45] Jul. 28, 1981

[54] APPARATUS FOR AND METHOD OF DEMOUNTING SLIDE SHOE

[75] Inventor: Erik C. Christensen, Copenhagen, Denmark

[73] Assignee: F. L. Smidth & Co., Creskill, N.J.

[21] Appl. No.: 41,997

[22] Filed: May 24, 1979

[30] Foreign Application Priority Data

May 25, 1978 [GB] United Kingdom .............. 22384/78

[51] Int. Cl.3 ............................................ B23P 19/04

[52] U.S. Cl. ................................................ 29/426.3

[58] Field of Search ................. 29/426.5, 426.1, 426.3, 29/149.5 B, 402.03, 724; 254/90, 7 C, 32, 100

[56] References Cited

U.S. PATENT DOCUMENTS

| | | | |
|---|---|---|---|
| 2,203,114 | 6/1940 | Vecker et al. | 254/100 X |
| 2,336,417 | 12/1943 | Petersen | 308/203 |
| 2,447,605 | 8/1948 | Treshow | 308/73 |
| 2,605,859 | 8/1952 | Moller | 184/6 |
| 2,606,081 | 8/1952 | Moller | 308/73 |
| 3,479,715 | 11/1969 | Hendrickson | 29/426.5 X |
| 3,851,854 | 12/1974 | Roybal | 254/7 C X |
| 4,084,790 | 4/1978 | Molnar | 254/90 |

*Primary Examiner*—Milton S. Mehr

*Attorney, Agent, or Firm*—Pennie & Edmonds

[57] ABSTRACT

An apparatus and a method is disclosed for removal of a cardanically supported slide shoe of a slide shoe bearing which supports a rotary tube mill disposed within a slide ring. The apparatus includes two horizontal track joists supported on upright members and oriented parallel to the axis of rotation of the mill. Each track joist supports an end of the slide shoe which preferably has horizontal surfaces at its ends for cooperating with the track joists. The apparatus also includes a plurality of screw jacks disposed between each of the track joists and its respective upright support members. The screw jacks can be independently operated to raise the slide shoe free of its cardanic support, preferably a ball and socket-type of joint. A carriage means disposed between an end of the slide shoe and a respective track joist facilitates displacement of the slide shoe along the track joists.

17 Claims, 3 Drawing Figures

APPARATUS FOR AND METHOD OF DEMOUNTING SLIDE SHOE

TECHNICAL FIELD

This invention relates to an apparatus for and method of demounting the slide shoes of a heavy slide shoe bearing and in particular for demounting a slide shoe supporting a slide ring disposed about a tube mill which is cardanically supported, e.g., by a ball section resting in a ball socket in a manner such that the slide shoe can when required, adjust itself according to the slide ring of the bearing.

BACKGROUND ART

Slide shoe bearings having cardanic supports are often used with tube mills disposed within a slide ring of the bearing. The cardanic supports are usually supported on rollers so as to permit displacement of the slide shoe in the direction of the axis of the mill. In this fashion, the slide shoes can follow movements of the slide ring in that direction, regardless whether such movements result from heat expansion of the mill or from the nonperpendicularity of the plane of the slide rings to the axis of rotation.

The slide ring, the slide shoes, and their supports are encased by a housing encircling the mill which has a short length in its axial direction since the housing is only slightly broader than the slide shoes. The housing is equipped with service hatches through which various kinds of mounting and service operations may be carried out, e.g., mounting of hoses and tubes for pressure lubricated slide shoes.

Sometimes it may be necessary to demount the slide shoe proper, e.g., when recasting a damaged bearing. Since this service is rather rare manufacturers until now have taken no steps to simplify its performance. In each instance, it has been necessary to use whatever means are available on the job which the engineers believe most appropriate.

The most common way of demounting the slide shoe has been to lift the mill sufficiently so that the ball section of the slide shoe is clear of the ball socket bearing. Then by means of a crane or similar device, the slide shoe is pulled up along the slide ring and out through the service hatch in the side of the housing. Such an operation involves great risk of damaging both the slide shoe and the elements meshing with it, e.g. the ball socket bearing. After servicing, the slide shoe, which often weighs more than a ton, is returned to its place by introducing it through the service hatch and lowering it down along the slide ring. A common feature of such replacements is that the operation has been extremely time-consuming.

DISCLOSURE OF INVENTION

An apparatus for removal of a supported slide shoe of a slide shoe bearing comprises at least two track means each being positioned so as to support a respective end of the slide shoe, and means for raising each track means so as to lift the slide shoe clear of its support and to permit displacement generally along the track means.

According to the present invention, an apparatus for demounting a cardanically supported slide shoe of a relatively heavy slide shoe bearing comprises at least two track joists, each track joist being arranged to support at least one end of the slide shoe, and means for displacing each track joist so as to lift the slide shoe sufficiently clear of its cardan support permitting displacement of the slide shoe along the track joists.

In particular, the slide shoe is cardanically supported by a ball and socket-type joint and the bearing supports a rotary member, such as a rotary tube mill. The track joists are oriented in a direction generally parallel to the axis of rotation of the member, i.e., the axis of rotation of the rotary tube mill. Means are provided for selectively raising and lowering each track joist whereby the slide shoe may be lifted clear of its cardan support and displaced horizontally along the track joists without changing the orientation thereof.

The invention also includes a method of removing a support slide shoe of a slide shoe bearing, the slide shoe being supported on a support means and supporting a rotary device, comprising the steps of supporting the slide shoe at its ends, lifting the rotary device clear of the slide shoe, lifting the slide shoe so as to uncouple the slide shoe from its support means, and displacing the slide shoe in a direction so as to remove the slide shoe from its support means.

In particular, the invention includes a method of demounting a slide shoe of a relatively heavy slide shoe bearing which supports a rotary device such as a rotating tube mill disposed within a slide ring to rotate therewith, the slide shoe bearing being cardanically supported by a ball and socket-type joint such that the slide shoe is adjustable on the slide ring of the bearing, comprising the steps of supporting the slide shoe at its ends, lifting the rotary device clear of the slide shoe, lifting the slide shoe in a generally vertical direction sufficient to uncouple the cardanic support, and displacing the slide shoe in a direction generally parallel to the axis of rotation of the rotary device for removal therefrom.

Preferably, the step of supporting the slide shoe comprises placing track joists of each end of the slide shoe and supporting the track joists atop screw jacks disposed at respective ends of a plurality of upright support legs. The step of lifting the slide shoe comprises manipulating the jacks to elevate the track joists.

A slide shoe for use with the method and apparatus of the invention includes at its ends means for cooperating with the apparatus of the invention, enabling the shoe to be supported at its ends by the said apparatus.

By supporting the slide shoe at its ends before lifting away the apparatus supported by the bearing, the slide shoe is prevented from tilting over its cardan support, and it is ensured that the surfaces chosen for supporting the slide shoe stay in place. By means of jacks, the slide shoe can be lifted clear of its cardan support and subsequently displaced along the track joists to a position where it can be removed easily by a crane or a truck. Such displacement of the slide shoe may be further facilitated if the support of the ends of the slide shoe takes place on a carriage, for example, an endless track assembly or rollers mounted between the ends of the slide shoe and the horizontal track joists.

BRIEF DESCRIPTION OF THE DRAWINGS

The present invention is described in detail below with reference to the drawings in which.

BEST MODE FOR CARRYING OUT THE INVENTION

Figure 1:
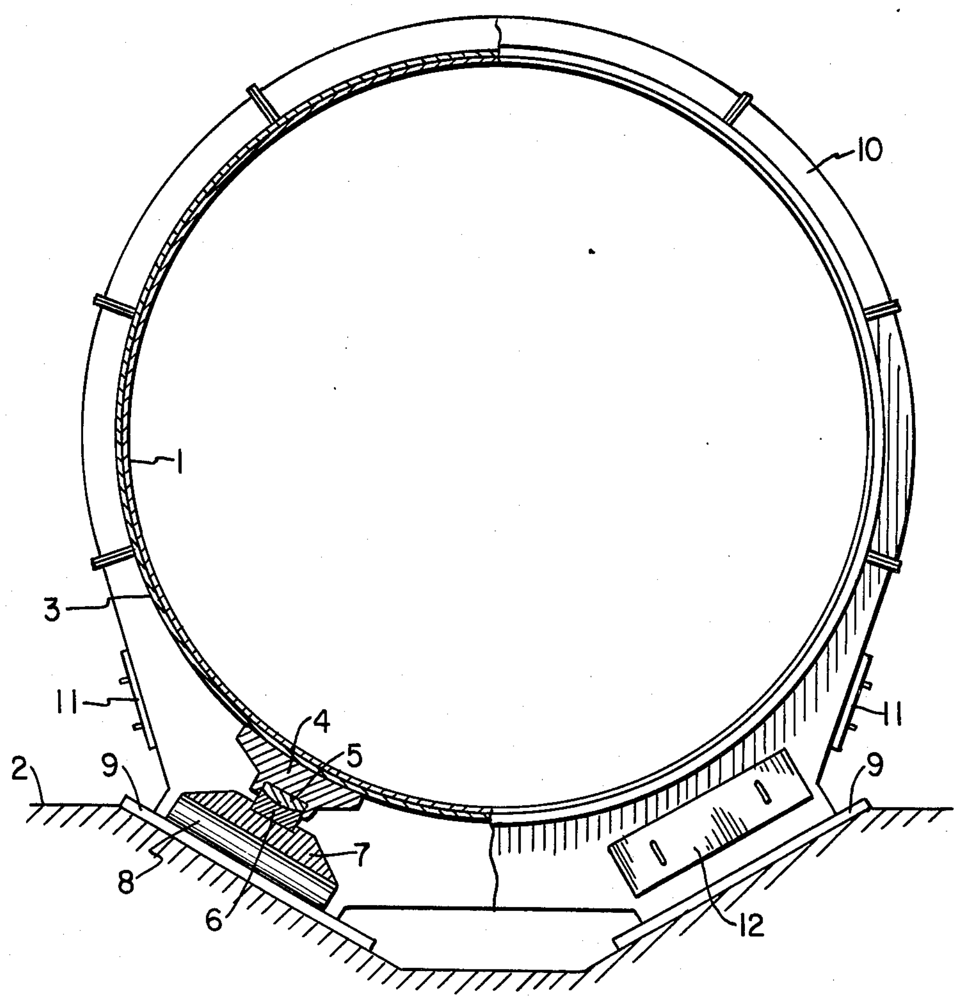
FIG. 1 is an elevational end view, partially in cross-section, of a rotary tube mill supported on a slide shoe bearing.
Figure 2:
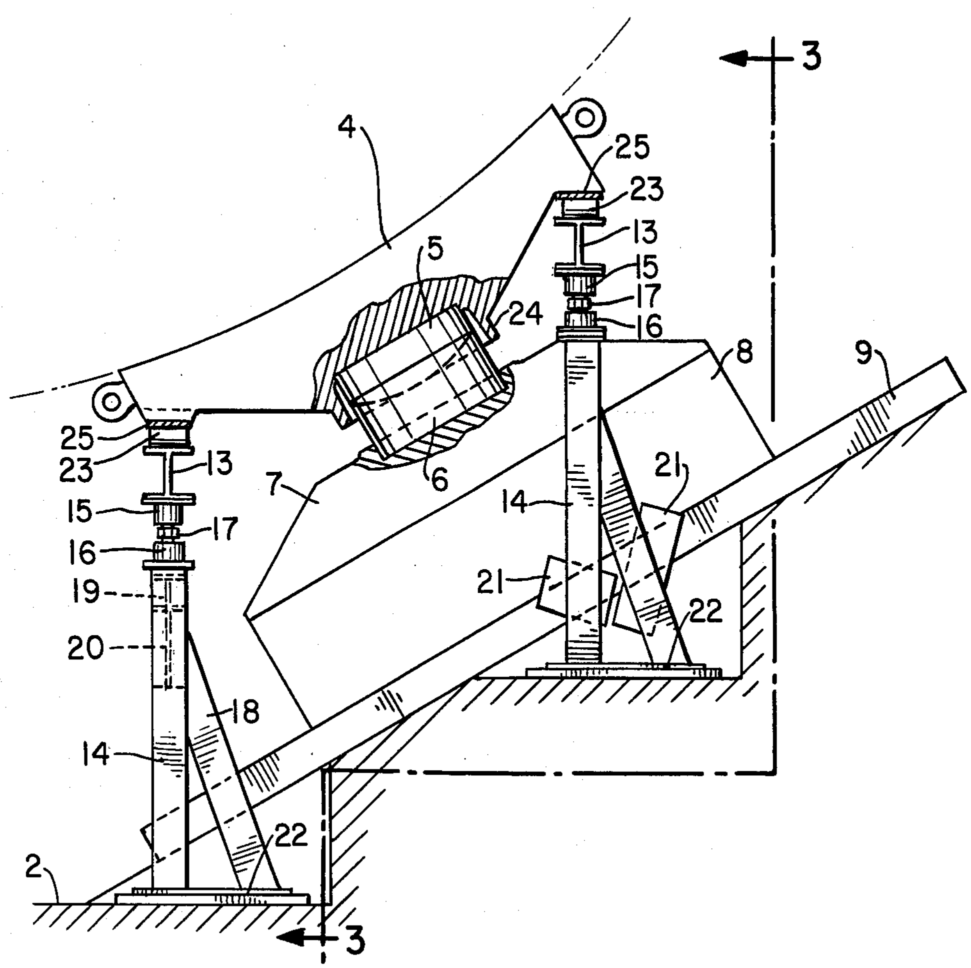
FIG. 2 is an elevational view of a demounting apparatus according to the present invention; and, FIG. 3 is a view taken along lines 3—3 of FIG. 2.

Referring to the FIGS., a tube mill 1 positioned within a slide ring 3 is shown in FIG. 2 supported on a foundation 2 by means of two heavy slide shoe bearings, (only one of which is shown).

The bearing includes a heavy slide shoe 4 which supportingly contacts the slide ring 3 and which, bears on a plate 7 by means of a cardan connection or support including a ball section shaped bearing part 5 and a ball socket shaped bearing part 6. The plate 7 bears on a bottom plate 9 resting on the foundation 2 by means of intermediate rollers 8.

A housing 10 provided with side hatches 11 and front hatches 12 encases the entire bearing structure.

Bearing lubrication is provided by filling the housing bottom with oil or by pumping the oil up to the individual slide shoes from a sump in the housing bottom. The slide shoes can be cooled by pumping water or other cooling agents through cooling ducts (not shown) in the slide shoe. Required servicing of the lubricating and cooling systems can be performed through hatch 11 and 12. Also, the slide shoes 4 can be removed in accordance with the present invention through the hatches 12.

Previously, the slide shoes 4 had been removed only through side hatches 11. Demounting of the slide shoes 4 had been performed by lifting the mill 1 and its slide ring 3 somewhat vertically away from the slide shoe 4, which then was pulled up along the slide ring 3 and out through the side hatch 11. When the slide shoe 4 was to be replaced with its ball section shaped bearing part 5 resting in the ball socket shaped bearing part 6, the slide shoe 4 was reintroduced through the side hatch 11 and lowered down along the slide ring 3. The slide shoe 4 was directed to its place on its cardan support through the service hatch 12. Since the slide shoes 4 often weighed 1-2 tons, this was by no means an easy task.

Figure 3:
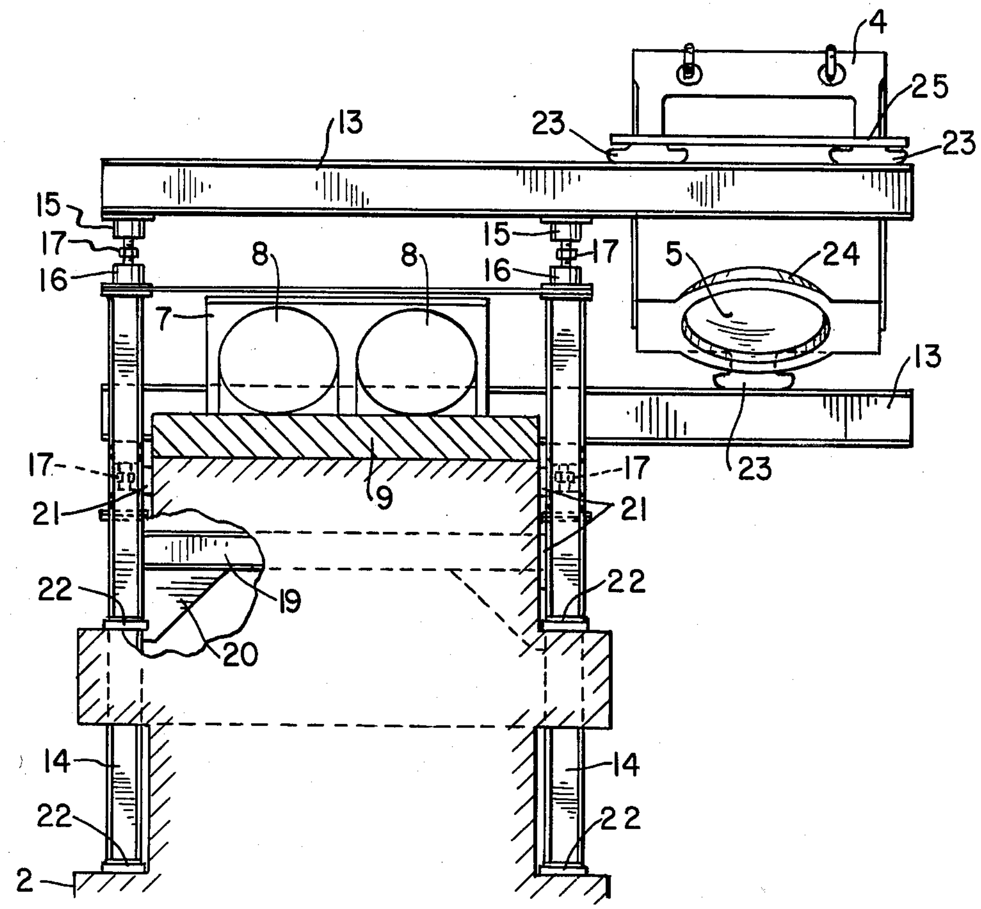

FIGS. 2 and 3 show demounting of a slide shoe by means of an apparatus according to the present invention. The apparatus comprises two track joists 13 oriented in the direction of the axis of rotation of the bearing. Each track joist 13 is supported by at least two legs 14. A jack coupled between each leg 14 and the track 13 includes an upper part 15 and a lower part 16 which can be operated by turning an intermediate device 17. The jacks between the legs 14 and the track joist 13 can be hydraulic or any other suitable kind. The legs 14 are provided with stiffeners 18 to stabilize the legs 14 against horizontal impacts perpendicular to the axis of rotation of the bearing. The legs 14 and their stiffeners 18 rest via a foundation plate 22 on the bearing foundation 2. For one pair of legs 14, stabilization is provided by a beam 19 parallel to the track joist 13 and connecting the legs supporting the respective joist 13. Further stiffening is provided by gusset plates 20. Since the legs 14 supporting the right-hand track joist in FIG. 2 cannot be provided with connection beams 19 in view of the intermediate plate 7 and rollers 8 of the slide shoe bearing, support for these legs on the bottom or foundation plate 22 can be provided by suitable cushions 21.

In demounting the slide shoe 4, a roller device 23 is positioned between the track joists 13 and the ends of the heavy slide shoe 4. In one embodiment, the roller device 23 can be a small carriage or a crawler roller. The track joists 13 are each lifted by means of the jacks in a manner such that the ends of the slide shoe rest directly on the roller devices 23. Then the mill 1 and the slide ring 3 are lifted from the slide shoe 4, preferably by lifting the mill 1 and placing it on fixed supports (not shown). The track joists 13 are subsequently lifted by means of the jacks, care being taken that the two track joists 13 are lifted to the same height, in a manner such that the slide shoe 4 is lifted vertically until its ball section shaped bearing part 5 and its surrounding flange 24 are sufficiently clear of the ball socket shaped bearing part 6 so that the slide shoe 4 on the roller devices 23 can be rolled out horizontally on the track joists 13 to a position where it can be easily removed by a crane or similar device for further maintenance.

The slide shoe 4 shown in FIGS. 2 and 3 is suitably adapted for cooperating with an appartus according to the present invention. In one embodiment, horizontal supporting surfaces can be provided at the ends of the slide shoe 4. In an alternative embodiment, horizontal supporting surfaces can be provided by suitable supporting plates 25 positioned between the ends of the slide shoe 4 and the driving means 23.

FIGS. 2 and 3 preferably show recesses in the mill foundation 2 for support of the legs 14 of the apparatus. Alternatively, other kinds of support can be used such as bolting-on or insertion type processes.

I claim:

1. Apparatus for removal of a supported slide shoe of a slide shoe bearing, comprising at least two track means each being positioned so as to support a respective end of the slide shoe, means for raising each track means so as to lift the slide shoe clear of its support and antifriction means for displacing the slide shoe generally along the track means.

2. Apparatus for demounting a cardanically supported slide shoe of a relatively heavy slide shoe bearing comprising at least two track joists, each track joist being arranged to support at least one end of the slide shoe, means for displacing each track joist so as to lift the slide shoe sufficiently clear of said cardan support and antifriction means for displacing the slide shoe along said track joists.

3. Apparatus for demounting a slide shoe of a relatively heavy slide shoe bearing wherein the slide shoe is cardanically supported by a ball and socket type joint and the bearing supports a rotary member, comprising at least two track joists oriented in a direction generally parallel to the axis of rotation of the member, each track joist being arranged to support at least one end of the slide shoe, means for selectively raising and lowering each track joist whereby said slide shoe may be lifted clear of its cardan support and antifriction means for displacing the slide shoe horizontally along the track joists without changing the orientation thereof.

4. The apparatus according to claim 3 wherein said rotary member is a rotary tube mill.

5. Apparatus for demounting a slide shoe of a relatively heavy slide shoe bearing wherein the slide shoe is cardanically supported by a ball and socket type joint and the bearing supports a rotary member, comprising at least two track joists oriented in a direction generally parallel to the axis of rotation of the member, each track joist being arranged to support at least one end of the slide shoe, means for selectively raising and lowering each track joist whereby the slide shoe may be lifted clear of its cardan support and displaced horizontally along the track joists without changing the orientation thereof, and carriage means for supporting the slide shoe, said carriage means being disposed on a respective track joist.

6. The apparatus according to claim 4 wherein said carriage means comprises an endless track assembly.

7. The apparatus according to claim 6 wherein the track joists are supported on upright support members.

8. The apparatus according to claim 7 wherein said track joists are generally horizontal.

9. The apparatus according to claim 8 wherein said means for raising and lowering each track joist is operative independently of the other track joist.

10. The apparatus according to claim 9 wherein said means for raising and lowering each track joist comprises a plurality of screw jacks disposed between each of said track joists and its respective upright support members, said screw jacks being capable of raising said slide shoe sufficient to remove the ball of the joint from its respective socket.

11. The apparatus according to claim 10 further comprising structural means for stabilizing said upright support members.

12. The apparatus according to claim 11 wherein the slide shoe includes generally horizontal surfaces at the ends thereof for cooperating with said track joists so as to support the slide shoe thereon.

13. The apparatus according to claim 12 further comprising a slide ring disposed about said rotary drum and slidably supported on said slide shoe.

14. A method of removing a support slide shoe of a slide shoe bearing, the slide shoe being supported on a support means and supporting a rotary device, comprising the steps of supporting the slide shoe at its ends, lifting the rotary device clear of the slide shoe, lifting the slide shoe so as to uncouple the slide shoe from its support means, and displacing the slide shoe in a direction so as to remove the slide shoe from its support means.

15. A method of demounting a slide shoe of a relatively heavy slide shoe bearing which supports a rotary device such as a rotating tube mill disposed within a slide ring to rotate therewith, said slide shoe bearing being cardonically supported by a ball and socket-type joint such that the slide shoe is adjustable on the slide ring of the bearing, comprising the steps of supporting said slide shoe at its ends, lifting the rotary device clear of the slide shoe, lifting the slide shoe in a generally vertical direction sufficient to uncouple the cardanic support, and displacing the slide shoe in a direction generally parallel to the axis of rotation of the rotary device for removal therefrom.

16. The method according to claim 15 wherein the step of supporting the slide shoe comprises placing track joists at each end of the slide shoe and supporting the track joists atop screw jacks disposed at respective ends of a plurality of upright support legs.

17. The method according to claim 16 wherein the step of lifting the slide shoe comprises manipulating the jacks to elevate the track joists.

* * * * *

UNITED STATES PATENT AND TRADEMARK OFFICE

CERTIFICATE OF CORRECTION

PATENT NO. : 4,280,267

DATED : July 28, 1981

INVENTOR(S) : ERIK CHRISTIAN PARMO CHRISTENSEN

It is certified that error appears in the above—identified patent and that said Letters Patent is hereby corrected as shown below:

In Column 2, line 36, "of each end" should be --at each end--.

In Column 4, line 55, "claim 3" should be --claim 5--.

Signed and Sealed this

*Third* Day of *November 1981*

[SEAL]

*Attest:*

GERALD J. MOSSINGHOFF

*Attesting Officer* *Commissioner of Patents and Trademarks*